(12) United States Patent
Lee (10) Patent No.: US 6,741,224 B2
(45) Date of Patent: May 25, 2004

(54) VIDEO PRE-AMPLIFIER AND METHOD FOR INCREASING NUMBER OF COLORS OF ON-SCREEN DISPLAY SIGNAL

(75) Inventor: Ji-hyun Lee, Kyungki-do (KR)

(73) Assignee: Samsung Electronics Co, Ltd. (KR)

( * ) Notice: Subject to any disclaimer, the term of this patent is extended or adjusted under 35 U.S.C. 154(b) by 317 days.

(21) Appl. No.: 09/950,937

(22) Filed: Sep. 12, 2001

(65) Prior Publication Data

US 2002/0089607 A1 Jul. 11, 2002

(30) Foreign Application Priority Data

Jan. 8, 2001 (KR) ............................................. 2001-920

(51) Int. Cl.[7] ................................................ G09G 1/14
(52) U.S. Cl. ........................... 345/20; 345/22; 345/690; 345/597; 348/564
(58) Field of Search ............................. 345/10, 11, 12, 345/13, 20, 22, 204, 690, 593, 600, 603, 601, 602, 629; 348/564, 566, 588, 589

(56) References Cited

U.S. PATENT DOCUMENTS

| | | | | |
|---|---|---|---|---|
| 5,619,229 A | * | 4/1997 | Kumaki | 345/690 |
| 5,670,972 A | * | 9/1997 | Kim | 345/13 |
| 6,037,978 A | * | 3/2000 | Kim | 348/194 |
| 6,100,886 A | * | 8/2000 | Lin | 345/709 |
| 6,104,360 A | * | 8/2000 | Kim | 345/11 |
| 6,191,760 B1 | * | 2/2001 | Jun et al. | 345/20 |
| 6,307,596 B1 | * | 10/2001 | Cho | 348/563 |
| 6,320,576 B1 | * | 11/2001 | Kim | 345/214 |
| 6,424,341 B2 | * | 7/2002 | Choi | 345/204 |

FOREIGN PATENT DOCUMENTS

| | | | | |
|---|---|---|---|---|
| KR | 10-316708 | 9/1999 | .......... | H04N/5/445 |
| KR | 10-308008 | 12/1999 | .......... | H04N/5/455 |

* cited by examiner

Primary Examiner—Xiao Wu
(74) Attorney, Agent, or Firm—Mills & Onello LLP (57) ABSTRACT

A video pre-amplifier for increasing OSD signal colors in a display device and a method thereof includes an OSD interface block, a video signal amplifying block, an IIC bus control unit, and an intensity control unit. An OSD interface block receives the R, G, and B OSD signals, modifies, or levels, the R, G, and B OSD signals in response R, G, and B control signal, and outputs the leveled R, G, and B OSD signals. A video signal amplifying block synthesizes the leveled R, G, and B OSD signals with the R, G, and B video signals, respectively, amplifies the synthesized signals, and generating R, G, and B output signals. An IIC bus control unit controls the interface between a microcontroller and the video signal amplifying block in the display device and generates a predetermined mode signal. An intensity control unit generates the R, G, and B control signals based on combinations of bits of the mode signal and a predetermined intensity control signal. Using the video pre-amplifier and the method of increasing the OSD signal colors, an increase in the number of output pins of the OSD processor and the number of input pins of the video pre-amplifier can be minimized, and an increase in the number of the OSD signal colors is possible.

15 Claims, 9 Drawing Sheets

VIDEO PRE-AMPLIFIER AND METHOD FOR INCREASING NUMBER OF COLORS OF ON-SCREEN DISPLAY SIGNAL

BACKGROUND OF THE INVENTION

1. Field of the Invention

The present invention relates to a display device, and more particularly, to an apparatus and a method for increasing the number of colors embedded in an on-screen display (hereinafter, referred to as OSD) signal.

2. Description of the Related Art

Color image signals are generally displayed on the screen of a display device using three signals: red, green and blue (R, G, and B). The color of an image signal varies depending on the relative strength, or intensity value, of the three signals R, G, and B. An OSD signal also displays user interface information on the screen of a display device using the three signals R, G, and B. An OSD occupies a portion of the screen of a display device, for example displaying information for interfacing with users.

Figure 1:
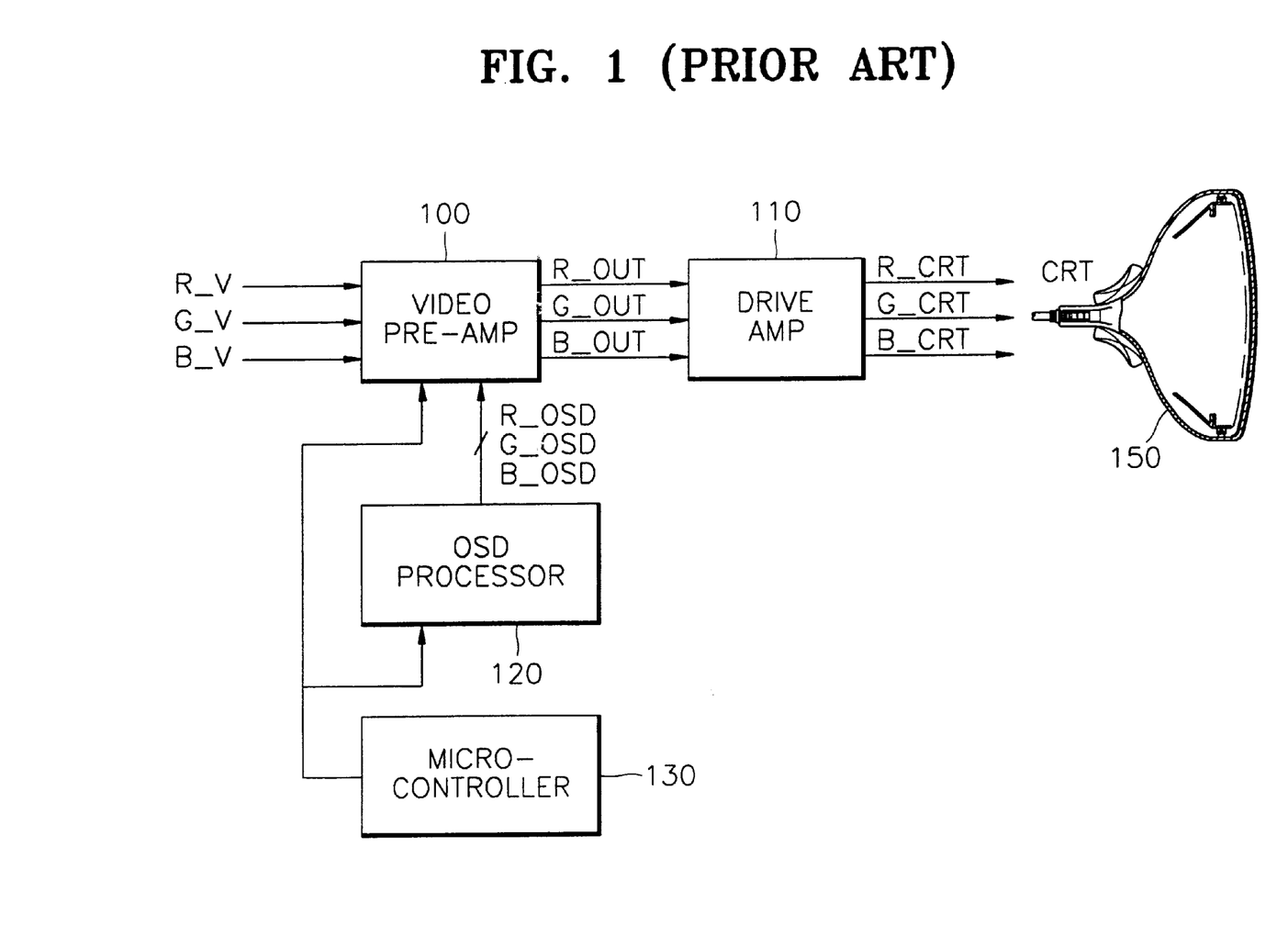
FIG. 1 is a schematic block diagram of a general display device.

FIG. 1 shows a schematic block diagram of a general display device. Referring to FIG. 1, the display device includes a video pre-amplifier 100, a drive amplifier 110, an OSD processor 120, and a micro-controller 130.

The video pre-amplifier 100 receives R, G, and B video signals R_V, G_V, and B_V and OSD signals R_OSD, G_OSD, and B_OSD, synthesizes each of the R, G, and B signals based on the video and OSD signals, and generates output signals R_OUT, G_OUT, and B_OUT in an intermediate step by amplifying the synthesized signals. The signals R_OUT, G_OUT, and B_OUT output from the video pre-amplifier 100 are reamplified in the drive amplifier 110, output to a monitor 150, and displayed on screen. The monitor 150 is, for example, a cathode ray tube (CRT) monitor.

The OSD signals R_OSD, G_OSD, and B_OSD are generated in the OSD processor 120 and input into the video pre-amplifier 100. The video pre-amplifier 100 and the OSD processor 120 are controlled by the micro-controller 130.

The OSD signals R_OSD, G_OSD, and B_OSD are, for example, each 1 bit and thus the OSD signals R_OSD, G_OSD, and B_OSD are a total of 3 bits. Therefore, 8(2*2*2) colors are expressed with the OSD signals R_OSD, G_OSD, and B_OSD of 3 bits. If the OSD signals R_OSD, G_OSD, and B_OSD are a total of 6 bits among which the OSD signals R_OSD, G_OSD, and B_OSD are each 2 bits, 64(4*4*4) colors can be expressed. If the OSD signals R_OSD, G_OSD, and B_OSD are a total of 9 bits among which the signals R_OSD, G_OSD, and B_OSD are each 3 bits, 512(8*8*8) colors can be expressed.

However, as shown in FIG. 1, the video pre-amplifier 100 and the OSD processor 120 are generally realized as different chips in the general display device. Thus, as the number of bits of the OSD signals R_OSD, G_OSD, and B_OSD increases, the number of output pins of the OSD processor 120 and the number of input pins of the video preamplifier 100 also increase.

Figure 2:
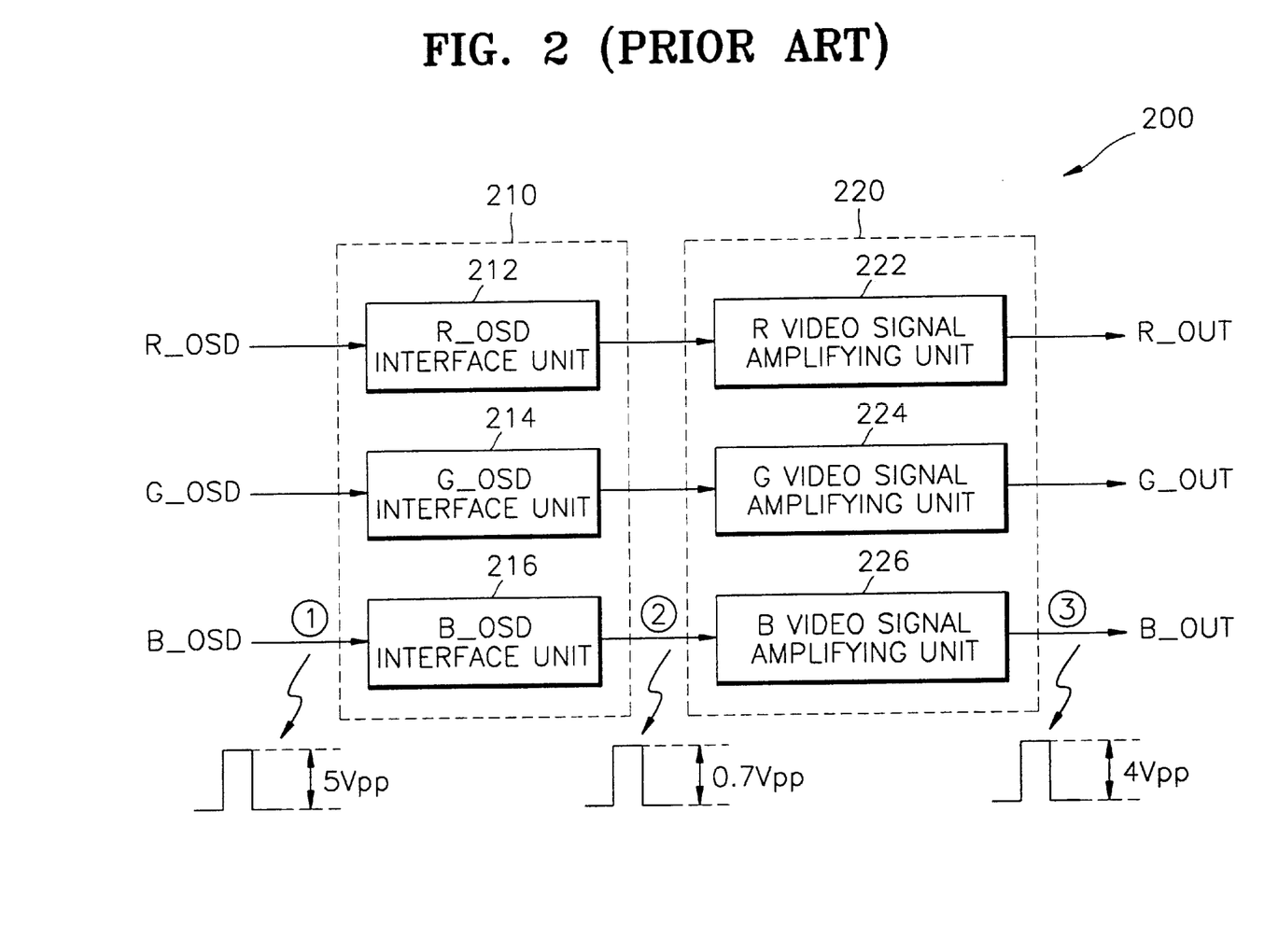
FIG. 2 is a block diagram of a video pre-amplifier according to the prior art.

A block diagram of a video pre-amplifier 200 according to the prior art in which OSD signals R_OSD, G_OSD, and B_OSD are a total of 3 bits is shown in FIG. 2. Referring to FIG. 2, the video pre-amplifier 200 comprises an OSD interface block 210 and a video signal amplifying block 220. The OSD interface block 210 receives OSD signals R_OSD, G_OSD, and B_OSD, each of which are 5 V peak-to-peak (hereinafter, pp is used to represent peak-to-peak) value, and levels them off to 0.7 Vpp. The video signal amplifying block 220 synthesizes the leveled OSD signals R_OSD, G_OSD, and B_OSD with video signals R, G, B; amplifies the synthesized signals; and generates output signals R_OUT, G_OUT, and B-OUT which are 4 Vpp.

Figure 3:
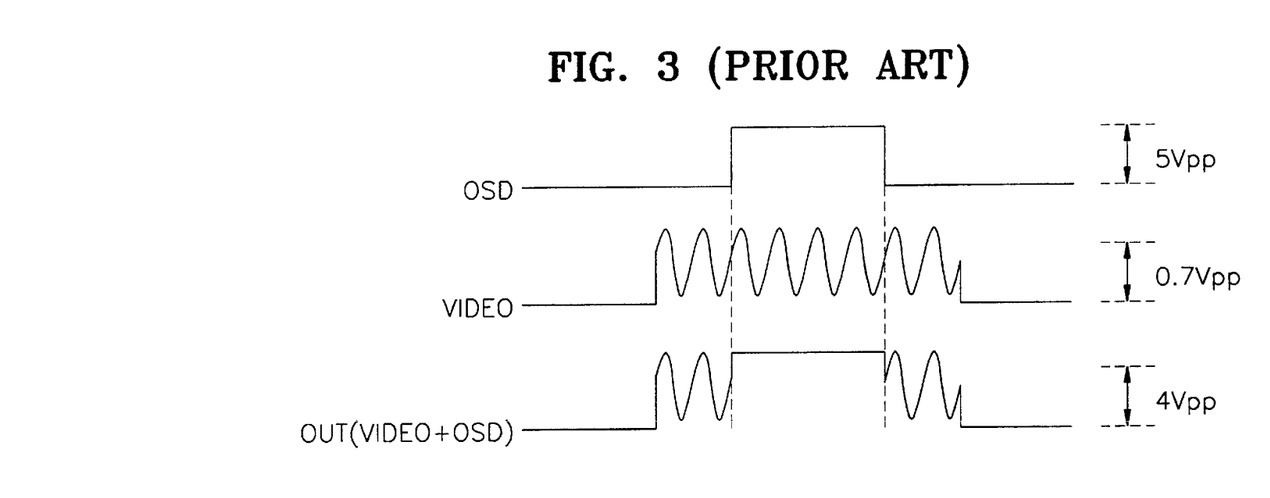
FIG. 3 is a waveform diagram for showing some of the signals in the video preamplifier shown in FIG. 2.

FIG. 3 shows a waveform diagram of an OSD signal OSD, a video signal VIDEO (R_V, G_V, and B_V in FIG. 1), and an output signal OUT (R_OUT, G_OUT, and B_OUT) in the video pre-amplifier 200 shown in FIG. 2. In the output signal OUT, the video signal VIDEO stops and the OSD signal OSD is output in a section of the output signal OUT. The OSD signal is a single bit and thus it has two levels, i.e., a high level '1' and a low level '0'.

Figure 4:
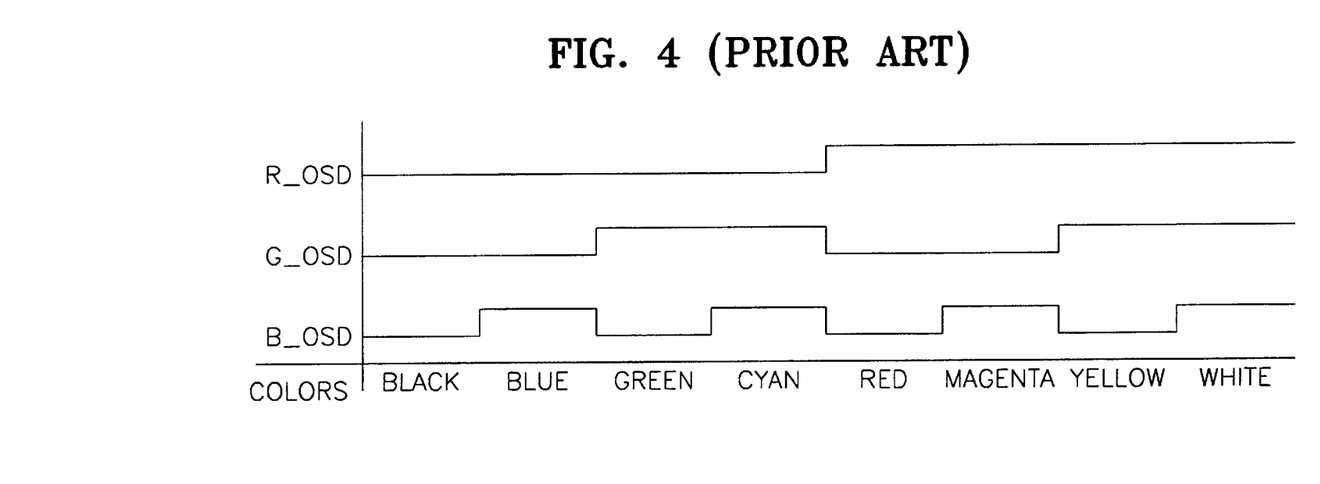
FIG. 4 is a diagram for showing the colors of an OSD signal which can be expressed when the video pre-amplifier shown in FIG. 2 is used.

A diagram for showing colors, which varies according to combinations of the R, G, B OSD signals R_OSD, G_OSD, and B_OSD in the video pre-amplifier 200 shown in FIG. 2, is illustrated in FIG. 4. The R, G, and B OSD signals R_OSD, G_OSD, and B_OSD are each 1 bit, i.e., a total of 3 bits. Thus, eight colors can be expressed. When the R, G, B OSD signals R_OSD, G_OSD, and B_OSD are at the levels '000', the color is 'Black'. The levels '001' produce 'Blue', the levels '010' produce 'Green', the levels '011' produce 'Cyan', the levels '100' produce 'Red', the levels '101' produce 'Magenta', the levels '110' produce 'Yellow', and the levels '111' produce 'White'.

As previously described, in the video pre-amplifier 200 according to the prior art, the R, G, and B OSD signals R_OSD, G_OSD, and B_OSD are each 1 bit and thus only eight colors was expressed. Conventionally, an OSD was simply designed in a single color due to the properties thereof and thus it was unnecessary to realize various colors by a difficult method. However, as methods for expressing OSDs change and the demand for a greater variety of elegant colors increases, there is an increasing need to express OSD signals in a variety of colors. For this reason, as the number of bits of the OSD signal increases, the number of output pins of the OSD processor 120 and the number of input pins of a video pre-amplifier 100 increase as previously described.

Consequently, a video pre-amplifier for a display device and a method of increasing the number of colors of an OSD capable of minimizing an increase in the number of input/output pins and providing a variety of colors are required.

SUMMARY OF THE INVENTION

To address the above limitations, it is an object of the present invention to provide a video pre-amplifier for a display device, which is capable of minimizing an increase in the number of input/output pins, while providing a variety of colors.

It is another object of the present invention to provide a method of increasing the number of colors of an OSD signal, which is capable of minimizing an increase in the number of input/output pins, while providing a variety of colors.

Accordingly, to achieve the above first object, according to an aspect of the present invention, there is provided a video pre-amplifier for a display device which synthesizes, amplifies and outputs received R, G, and B video signals and R, G, and B OSD (On-Screen Display) signals, respectively. The video pre-amplifier for a display device includes; an OSD interface block for receiving the R, G, and B OSD signals, modifying, or leveling, their peak-to-peak voltage levels in response to a predetermined intensity control signal, and outputting the leveled R, G, and B OSD signals;

and a video signal amplifying block for synthesizing the leveled R, G, and B OSD signals with the R, G, and B video signals, respectively, amplifying the synthesized signals, and generating R, G, and B output signals.

According to another aspect of the present invention, there is provided a video pre-amplifier for a display device which synthesizes, amplifies, and outputs received R, G, and B video signals and R, G, and B OSD (On-Screen Display) signals, respectively. The video pre-amplifier includes: an OSD interface block for receiving the R, G, and B OSD signals and outputting modified, or leveled R, G, and B OSD signals, the OSD interface block having an R OSD interface unit for leveling the R OSD signal in response to an R control signal and generating the leveled R OSD signal, a G OSD interface unit for leveling the G OSD signal in response to a G control signal and generating the leveled G OSD signal, and a B OSD interface unit for leveling the B OSD signal in response to a B control signal and generating the leveled B OSD signal; a video signal amplifying block for synthesizing the leveled R, G, and B OSD signals with the R, G, and B video signals, respectively, amplifying the synthesized signals, and generating R, G, and B output signals; an IIC bus control unit for being in charge of an interface between a micro-controller and the video signal amplifying block in the display device and generating a predetermined mode signal; and an intensity control unit for generating the R, G, and B control signals based on combinations of bits of the mode signal and a predetermined intensity control signal.

To achieve the second object, there is provided a method of increasing OSD signal colors in a display device having a video pre-amplifier which synthesizes, amplifies, and outputs received R, G, and B video signals and R, G, and B OSD (On-Screen Display) signals, respectively, including: setting a predetermined intensity control signal and a mode signal; generating R, G, and B control signals based on combinations of bits of the intensity control signal and the mode signal; leveling the R, G, and B OSD signals based on the R, G, and B control signals, respectively; synthesizing the leveled R, G, and B OSD signals with the R, G, and B video signals, respectively; and generating R, G, and B output signals by amplifying the synthesized signals.

Using the video pre-amplifier and the method of increasing the OSD signal colors, an increase in the number of output pins of an OSD processor and the number of input pins of the video pre-amplifier can be minimized, and an increase in the number of OSD signal colors is possible.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Hereinafter, preferred embodiments of the present invention will be described in detail with reference to the attached drawings. Like reference numerals in the drawings denote the same members.

Figure 5:
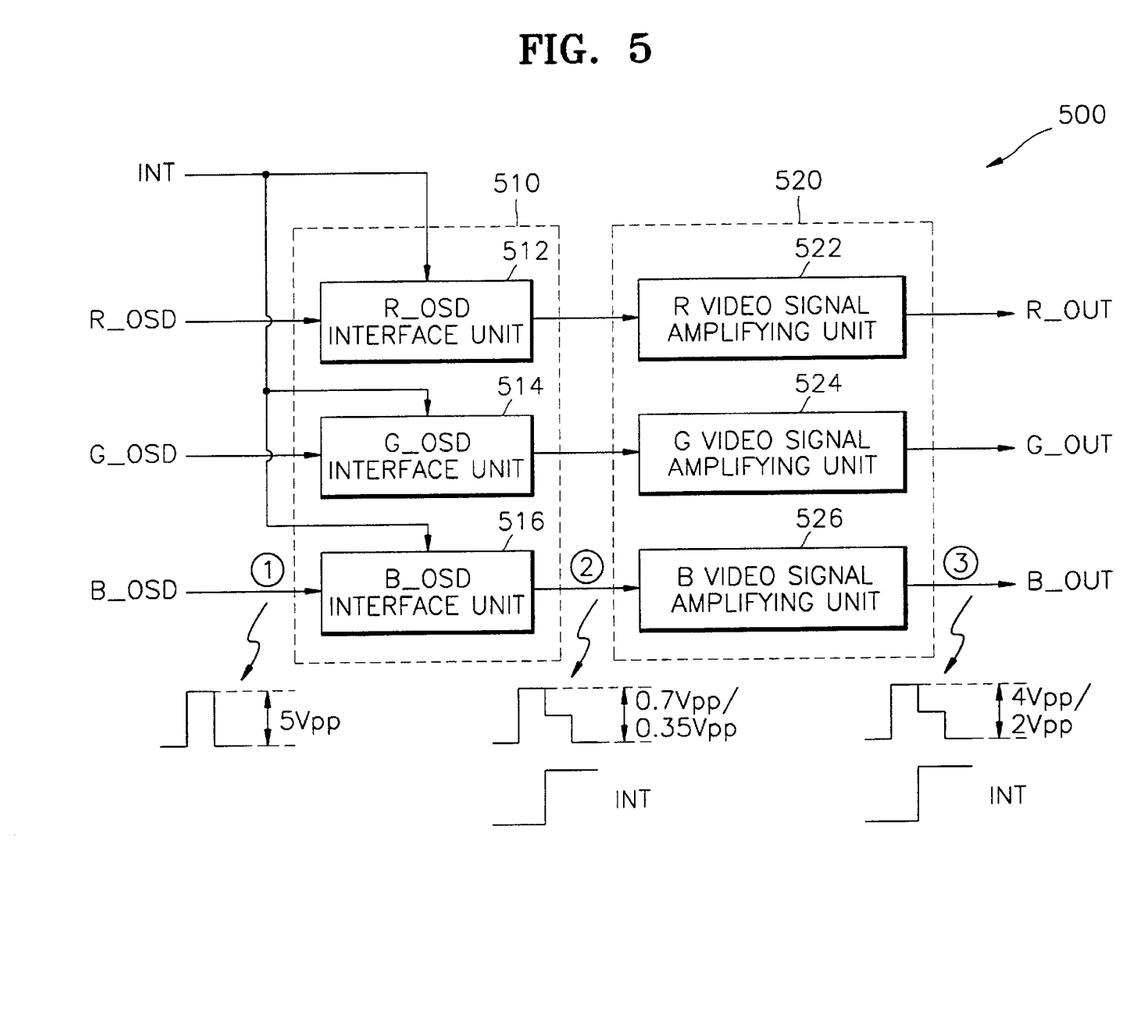
FIG. 5 is a block diagram of a video pre-amplifier according to an embodiment of the present invention.

FIG. 5 shows a diagram of a video pre-amplifier 500 according to an embodiment of the present invention. Referring to FIG. 5, the video pre-amplifier 500 comprises an OSD interface block 510 and a video signal amplifying block 520.

The OSD interface block 510 includes an R_OSD interface unit 512, a G_OSD interface unit 514, and a B_OSD interface unit 516. The R_OSD interface unit 512, the G_OSD interface unit 514, and the B_OSD interface unit 516 receive and level R, G, and B OSD signals R OSD, G_OSD, and B_OSD, respectively. The OSD interface block 510 is controlled by an intensity control signal INT. The intensity control signal INT is input into each of the R, G, and B OSD interface units 512, 514, and 516. If the intensity control signal INT is at a predetermined first intensity level, the respective R, G, B OSD interface units 512, 514, and 516 output R, G, B OSD signals which have been leveled to 0.7 Vpp. In other words, 5 Vpp OSD R, G, and B signals R_OSD, G_OSD, and B_OSD are transformed into 0.7 Vpp signals and output in the OSD interface block 510. In the present embodiment, it is assumed that the first intensity level is low.

The video signal amplifying block 520 includes an R video signal amplifying unit 522, a G video signal amplifying unit 524, and a B video signal amplifying unit 526. The R, G, and B video signal amplifying units 522, 524, and 526 synthesize the leveled R, G, and B OSD signals, respectively, output from the OSD interface block 510 with R, G, and B video signals; amplify the synthesized signals to predetermined levels; and generate R, G, and B output signals R_OUT, G_OUT, B_OUT. Here, in the synthesis of the OSD signals and the video signals, the OSD signal is output in a section of the OSD signal and the video signal is output in a section of no OSD signal. The R, G, and B output signals R_OUT, G_OUT, and B_OUT are 4 Vpp signals. The R, G, and B output signals R_OUT, G_OUT, and B_OUT are displayed on the screen of the monitor 150 through the drive amplifier 110. The displayed colors of the OSD signal are the same as those shown in FIG. 4. That is, eight basic colors can be expressed.

If the intensity control signal INT input into the OSD interface block 510 is at a predetermined second intensity level (for example a high level in the present embodiment), the R, G, and B OSD interface units 512, 514, and 516 output leveled R, G, and B OSD signals, respectively, which have been leveled to 0.35 Vpp, rather than 0.7 Vpp. The value of 0.35 Vpp, output when the intensity control signal INT is at a high level, is half that of 0.7 Vpp which is output when the intensity control signal INT is at a low level.

Figure 6:
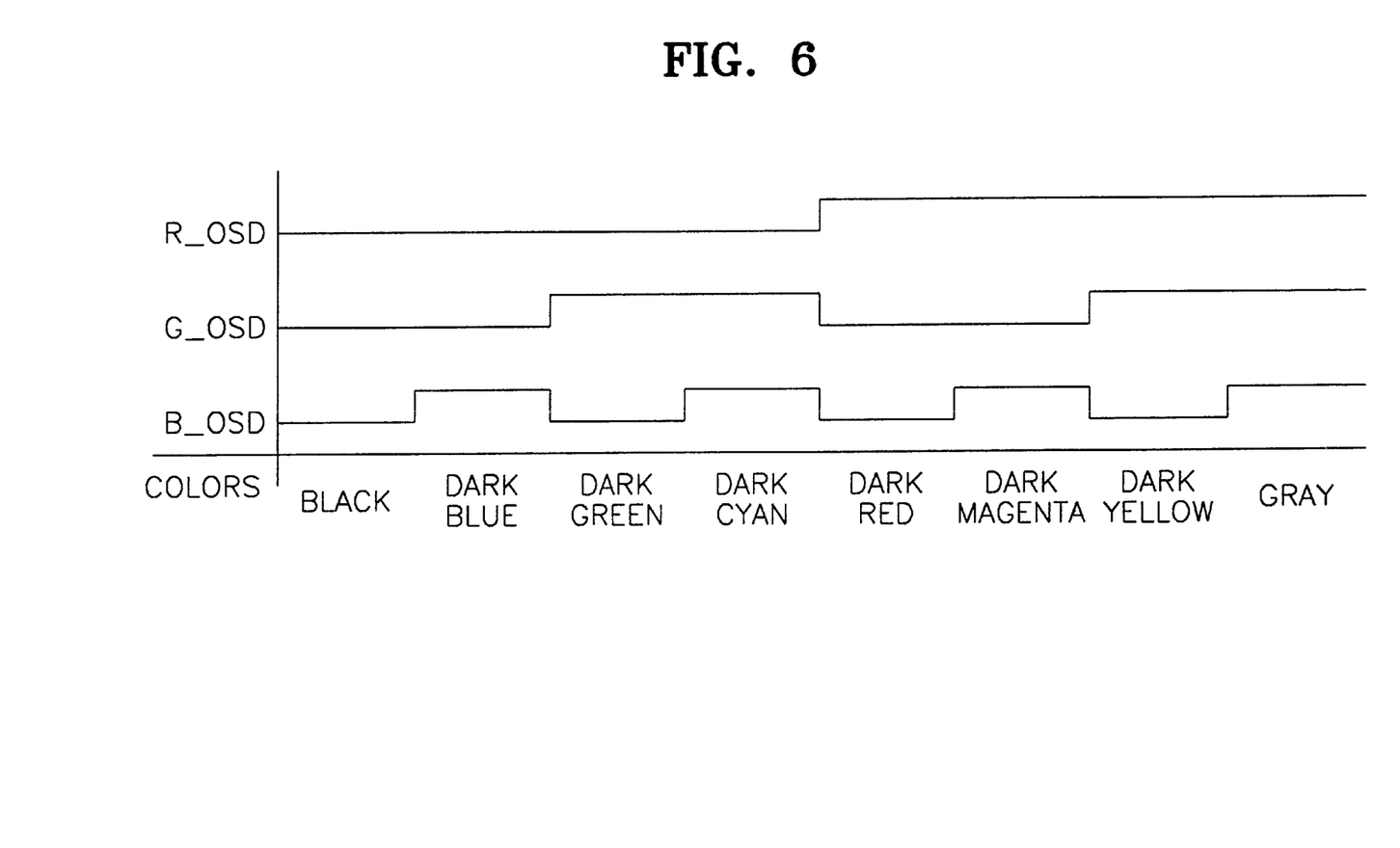
FIG. 6 is a diagram for showing the colors of an OSD signal which can be additionally expressed when the video pre-amplifier shown in FIG. 5 is used.

If the intensity control signal INT is at a high level, the displayed colors of the OSD signal are not the same as those shown in FIG. 4. That is, the displayed colors of the OSD signal are different from those of the OSD signal when the intensity control signal INT is at a low level. The colors of the OSD signal when the intensity control signal INT is at a high level are shown in FIG. 6. With reference to FIG. 6, R, G, and B OSD signals R_OSD, G_OSD, and B_OSD are at the levels '000', the color is 'Black'. The levels '111' produce 'Gray', the levels '001' produce 'Dark Blue', the levels '010' produce 'Dark Green', the levels '011' produce 'Dark Cyan', the levels '100' produce 'Dark Red', the levels '101' produce 'Dark Magenta', and the levels '110' produce 'Dark Yellow'.

Accordingly, in this embodiment, seven colors, not including 'Black', can be additionally expressed using the uniform intensity control signal INT input into the R, G, B OSD interface units 512, 514, and 516. Therefore, fifteen OSD signal colors can be expressed using the video pre-amplifier 500 according to an embodiment of the present invention shown in FIG. 5.

It is preferable that the intensity control signal INT be a signal output from the micro-controller in the display device. Meanwhile, the intensity control signal INT may be input from the OSD processor to the video pre-amplifier 500.

In the example of the video pre-amplifier 500 provided, according to an embodiment of the present invention, the intensity control signal INT preferably controls the R, G, and B OSD interface units 512, 514, and 516 at the same time. In other words, when the intensity control signal INT is at a high level, leveled OSD signals output from the R, G, and B interface units 512, 514, and 516 are all half of leveled OSD signals when the intensity control signal INT is at a low level. If the intensity control signal INT controls the R, G, and B OSD interface units 512, 514, and 516 independently, rather than as a group, then many more OSD signal colors can be expressed. However, as the number of the intensity control signal INT increases, the number of input pins of the video pre-amplifier 500 also increases.

It is preferable that an apparatus and a method for controlling the R, G, and B OSD interface units 512, 514, and 516 are provided by inputting only a single intensity control signal INT. An example of such an apparatus is shown in FIG. 7.

Figure 7:
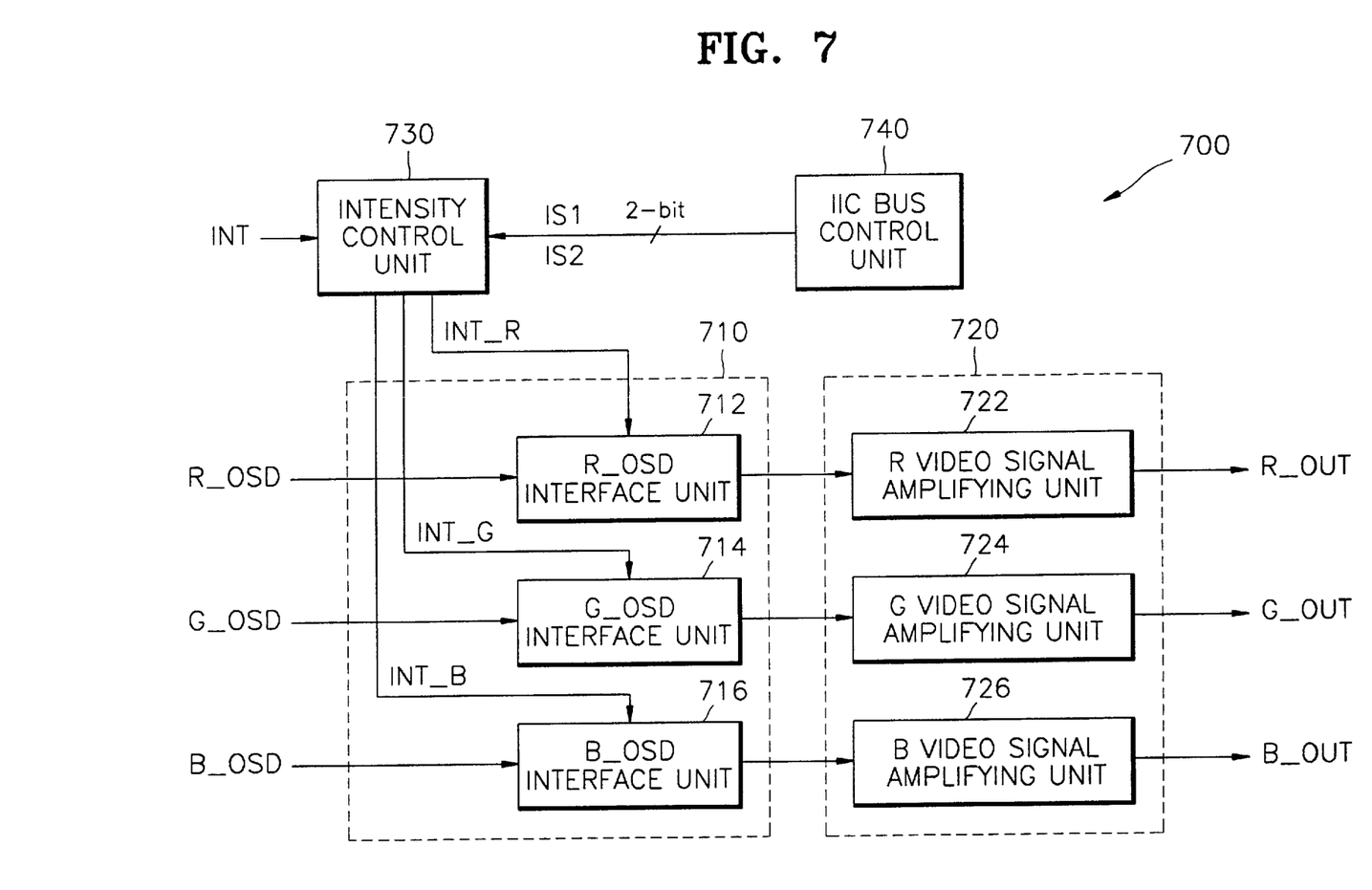
FIG. 7 is a block diagram of a video pre-amplifier according to an embodiment of the present invention.

FIG. 7 shows a block diagram of a video pre-amplifier 700 according to another embodiment of the present invention. Referring to FIG. 7, the video pre-amplifier 700 includes an OSD interface block 710, a video signal amplifying block 720, an intensity control unit 730, and an IIC bus control unit 740.

The OSD interface block 710 and the video signal amplifying block 720 have the same structures as the OSD interface block 510 and the video signal amplifying block 520. Therefore, a detailed description of the OSD interface block 710 and the video signal amplifying block 720 is omitted. However, unlike the R, G, and B OSD interface units 512, 514, and 516 shown in FIG. 5, the R, G, and B OSD interface units 712, 714, and 716 receive R, G, and B control signals INT_R, INT_G, and INT B, respectively, output from the intensity control unit 730, rather than directly receiving an intensity control signal INT as shown in FIG. 5. Consequently, the R, G, and B OSD interface units 712, 714, and 716 are separately controlled.

The IIC bus control unit 740 is a circuit block for controlling an IIC bus which, for example is a type of serial bus. The IIC bus is generally used as an interface between integrated circuit (IC) chips.

The IIC bus control unit 740 receives predetermined control signals from the micro-controller 130 of FIG. 1 to control the video signal amplifying block 720 and transmits them to the video signal amplifying block 720. Such an IIC bus control unit 740 for interfacing between the micro-controller 130 and the video signal amplifying block 720 is a commonly-used circuit.

Meanwhile, the IIC bus control unit 740 in the video pre-amplifier 700 according to another embodiment of the present invention generates mode signals IS for adjusting OSD signal colors, besides the interface function between the micro-controller 130 and the video signal amplifying block 720. It is preferable that the mode signals IS be digital signals consisting of one or more bits. Also, the mode signals IS are preferably stored into a register of the IIC bus control unit 740. Users of the video pre-amplifier 700, i.e., producers of display devices using the video pre-amplifier 700, or users of display devices with the video pre-amplifier 700 can set the mode signals IS stored in the register of the IIC bus control unit 740 through the micro-controller 130.

In this embodiment, 2-bit mode signals IS are used. For descriptive convenience, 2-bit IS signals denote first and second mode bits IS1 and IS2, respectively.

The intensity control unit 730 receives the intensity control signal INT and the mode signals IS and generates R, G, and B control signals INT_R, INT_G, and INT_B. The intensity control signal INT is input from the micro-controller 130 or the OSD processor 120. The detailed circuit structure of the intensity control unit 730 will be described below with reference to FIG. 9.

Figure 8A:
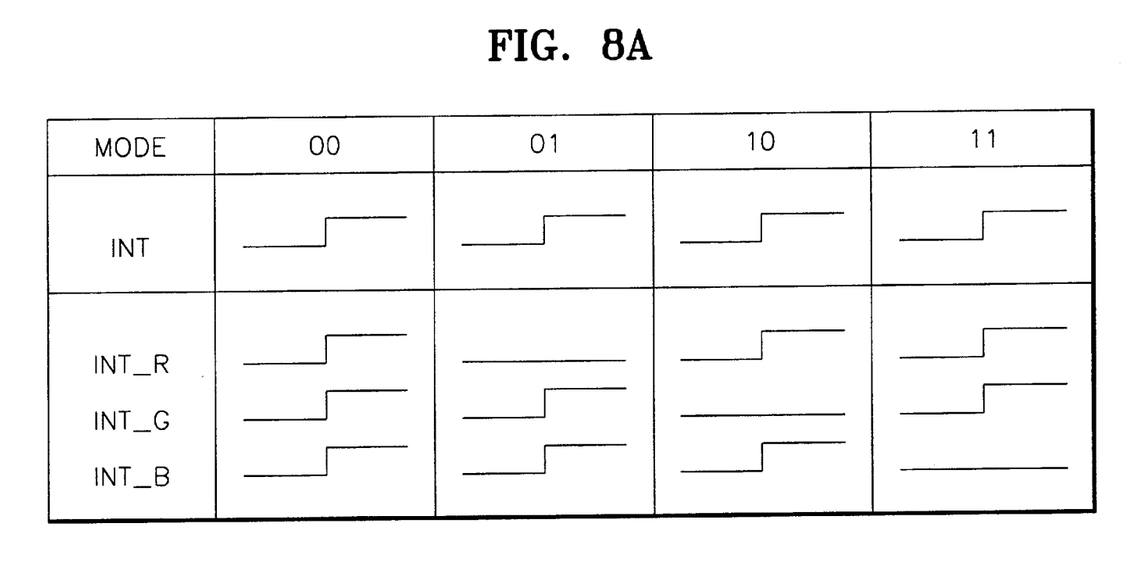
FIG. 8A is a diagram for showing levels of control signals R, G, B according to intensity control signals and mode signals in the video pre-amplifier shown in FIG. 7.

Levels of the R, G, and B control signals INT_R, INT_G, and INT_B are determined based on combinations of the intensity control signal INT and the mode signals IS and are shown in FIG. 8A. Referring to FIG. 8A, since the mode signals IS consist of 2 bits, four modes are available based on combinations of the first and second mode bits IS1 and IS2. That is, first and second mode bits IS1 and IS2 of '00' indicate a first mode. Also, mode bits IS1 and IS2 of '01' indicate a second mode, mode bits IS1 and IS2 of '10' indicate a third mode, and mode bits IS1 and IS2 '11' indicate a fourth mode. If the intensity control signal INT is at a predetermined first intensity level (low level in this embodiment), the R, G, and B control signals INT_R, INT_G, and INT B are at a first control level (low level in this embodiment) regardless of the mode. Consequently, the R, G, and B interface units 712, 714, and 716 output R, G, B OSD signals, respectively, which have been leveled to 0.7 Vpp.

If the intensity control signal INT is at a predetermined second level (high level in this embodiment) and in mode '00', the R, G, and B control signals INT_T, INT_G, and INT_B are all at second control levels (high levels in this embodiment). Consequently, the R, G, and B OSD interface units 712, 714, and 716 output R, G, B OSD signals, respectively, which have been leveled to 0.35 Vpp.

If the intensity control signal INT is at a high level and in mode '01', the R control signal INT_R is at a low level and the G and B control signals INT_G, and INT_B are at high levels. Thus, the R OSD interface unit 712 outputs an R OSD signal which has been leveled to 0.7 Vpp and the G and B OSD interface units 714 and 716 output G and B OSD signals which have been leveled to 0.35 Vpp.

If the intensity control signal INT is at a high level and in mode '10', the G control signal INT_G is at a low level and the R and B control signals INT_R, and INT_B are at high levels. Thus, the G OSD interface unit 714 outputs a G OSD signal which has been leveled to 0.7 Vpp and the R and B OSD interface units 712 and 716 output R and B OSD signals which have been leveled to 0.35 Vpp.

If the intensity control signal INT is at a high level and in mode '11', the B control signal INT_B is at a low level and the R and G control signals INT_R, and INT_G are at high levels. Consequently, the B OSD interface unit 716 outputs a B OSD signal which has been leveled to 0.7 Vpp and the R and G OSD interface units 712 and 714 output R and G OSD signals which have been leveled to 0.35 Vpp.

Figure 8B:
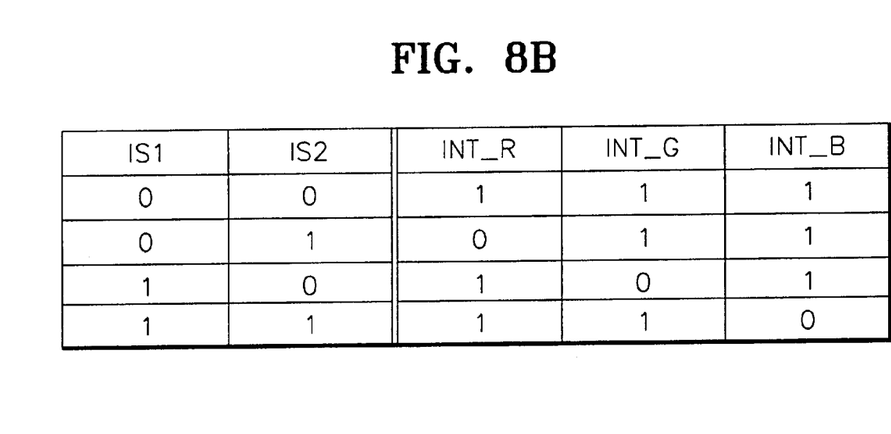
FIG. 8B is a diagram for showing logic relationships of control signals R, G, B according to first and second mode bits when intensity control signals are at high levels in the video pre-amplifier shown in FIG. 7.

FIG. 8B shows the logic relations among the R, G, and B control signals INT_R, INT_G, and INT_B based on the first and second mode bits IS1 and IS2. When the intensity control signal INT is at a high level, the logic relations shown in FIG. 8B are expressed as formula (1):

$$/INT\_R = /IS1\char`\^IS2$$
$$/INT\_G = IS1\char`\^/IS2$$
$$/INT\_B = IS1\char`\^IS2 \quad (1)$$

where / refers to inversed signals and ^ refers to logic products.

Figure 9:
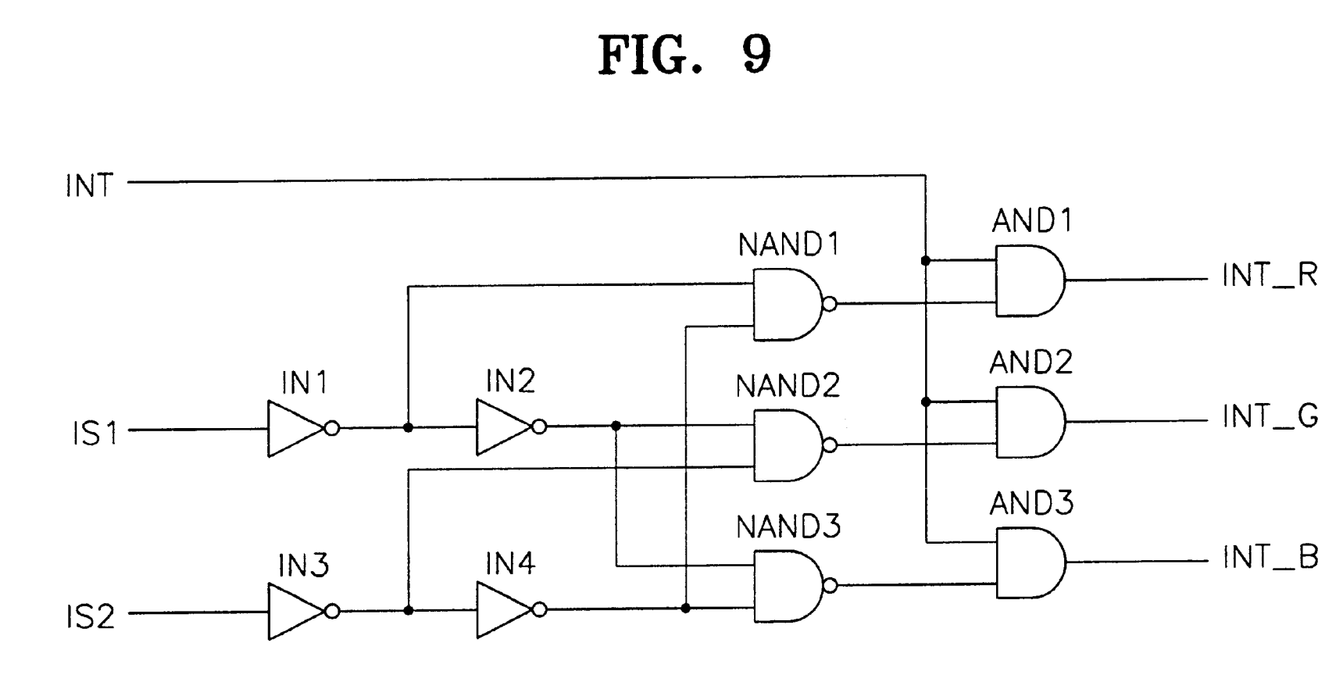
FIG. 9 is a circuit diagram showing an embodiment of an intensity control unit in the video pre-amplifier shown in FIG. 7.

The circuit shown in FIG. 9 is a possible embodiment of the intensity control unit 730 based on the logic relations given in formula 1. The intensity control unit 730 includes a plurality of logic circuits, and more particularly, four invertors IN1~IN4, three NAND gates NAND1~NAND 3, and three AND gates AND1~AND3.

The first NAND gate NAND1 receives the second mode bit IS2 and the inverted signals of the first mode bit IS1 and performs a NAND operation on them. The second NAND gate NAND2 receives the first mode bit IS1 and the inverted signals of the second mode bit IS2 and performs a NAND operation on them. The third NAND gate NAND3 receives the first and second mode bits IS1 and IS2 and performs a NAND operation on them. Also, the first through third AND gates AND1, AND2, and AND3 perform AND operations on the output signals of the first to third NAND gates NAND1~NAND3, respectively, and the intensity control signal INT and output the R, G, and B control signals INT_R, INT_G, and INT_B, respectively.

Figure 10:
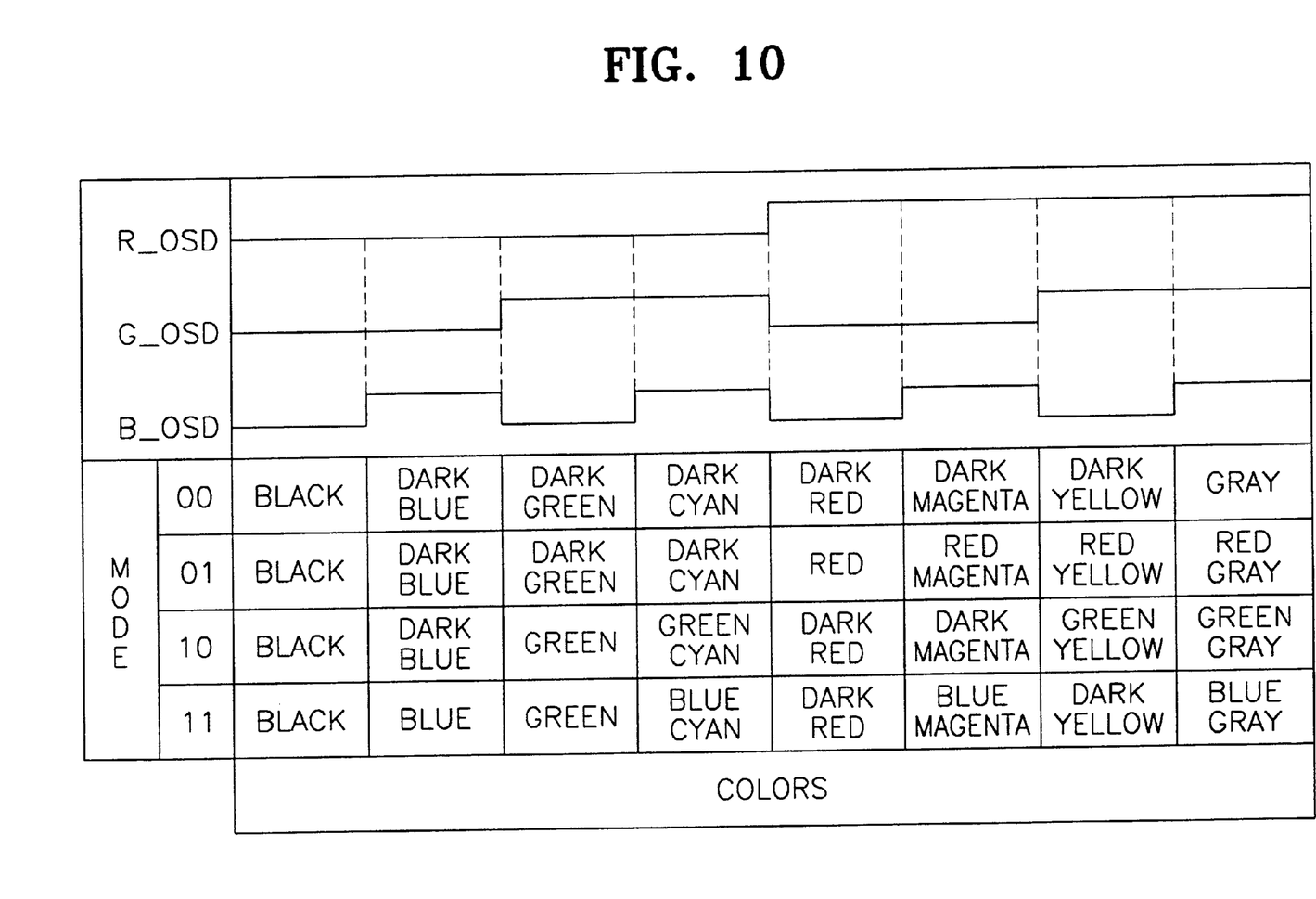
FIG. 10 is a diagram showing colors of an OSD signal in every mode when intensity control signals are at high levels in the video pre-amplifier shown in FIG. 7.

As described above, the R, G, and B OSD signals R_OSD, G_OSD, and B_OSD can be independently, and differently, leveled in the R, G, and B OSD interface units 712, 714, and 716. Thus, OSD signal colors displayed on screen may somewhat differ from the previously mentioned eight basic colors. When the intensity control signal INT is at a high level, the resulting OSD signal color in each mode is shown in FIG. 10. Referring to FIG. 10, when the R, G, and B OSD signals R_OSD, G_OSD, and B_OSD are '000', '001', '010', '011', '100', '101', '101', and '111' in mode '00', 'Black', 'Dark Blue', 'Dark Green', 'Dark Cyan', 'Dark Red', 'Dark Magenta', 'Dark Yellow', and 'Gray' colors are expressed. 'Black' is the same as when the intensity control signal INT is at a low level. Therefore, fifteen colors are obtained in mode '00' based on the combinations of low and high levels of the intensity control signal INT.

When the R, G, and B OSD signals R_OSD, G_OSD, and B_OSD are '000', '001', '010', '011', '100', '101', '101', and '111' in mode '01', 'Black', 'Dark Blue', 'Dark Green', 'Dark Cyan', 'Red', 'Red Magenta', 'Red Yellow', and 'Red Gray' colors are expressed.

When the R, G, and B OSD signals R_OSD, G_OSD, and B_OSD are '000', '001', '010', '011', '100', '101', '101', and '111' in mode '10', 'Black', 'blue', 'Dark Blue', 'Green', 'Green Cyan', 'Dark Red', 'Dark Magenta', 'Green Yellow', and 'Green Gray' colors are expressed.

When the R, G, and B OSD signals R_OSD, G_OSD, and B_OSD are '000', '001', '010', '011', '100', '101', '101', and '11' in mode '11', 'Black', 'Blue', 'Green', 'Blue Cyan', 'Dark Red', 'Blue Magenta', 'Dark Yellow', and 'Blue Gray' colors are expressed.

'Dark Red', 'Dark Green', and 'Dark Blue' cannot be obtained in any of modes '01', '10', and '11'. Thus, fourteen colors are obtained in mode '01', '10', and '11' based on the combinations of low and high levels of the intensity control signal INT.

In another embodiment of the present invention, the R, G, and B control signals INT_R, INT_G, and INT_B are all at high levels, or at least two control signals are at high levels based on the combinations of the first and second mode bits IS1 and IS2. However, it is apparent that levels of the R, G, and B control signals INT_R, and INT_G, INT_B may be transformed into different levels than this embodiment. For example, the levels of the R, G, and B control signals INT_R, INT_G, and INT_B in modes '01', '10', and '11' may be inverse levels of the cases of this embodiment. That is, in mode '01', the R control signal INT_R may be at a high level and the G and B control signals INT_G and INT_B may be at low levels. In mode '10', the G control signal INT_G may be at a high level and the R and B control signals INT_R and INT_B may be at low levels. In mode '11', the B control signal INT_B may be at a high level and the R and G control signals INT_R and INT_G may be at low levels.

Using a video pre-amplifier and a method of increasing OSD signal colors according to the present invention, an increase in the number of output pins of an OSD processor and the number of input pins of the video pre-amplifier can be minimized and the number of OSD signal colors can be increased. In particular, according to the embodiments of the present invention, if the number of input pins of the video pre-amplifier increases by one, twice as many OSD colors can be expressed, as compared with the existing colors.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A video pre-amplifier for a display device which synthesizes, amplifies and outputs received red, green and blue (R, G, and B) video signals and R, G, and B on-screen display (OSD) signals, respectively, comprising:

an OSD interface block for receiving the R, G, and B OSD signals, for modifying the peak-to-peak voltage levels of the R, G, and B OSD signals in response to an OSD intensity control signal, and for outputting the modified R, G, and B OSD signals; and a video signal amplifying block for synthesizing the modified R, G, and B OSD signals with the R, G, and B video signals, respectively, for amplifying the synthesized signals, and for generating R, G, and B output signals.

2. The video pre-amplifier of claim 1, wherein the OSD intensity control signal is a single bit signal, and wherein the OSD interface block adjusts the R, G, and B OSD signals to first levels in response to the OSD intensity control signal being at a first intensity level and to second levels in response to the OSD intensity control signal being at a second intensity level.

3. The video pre-amplifier of claim 2, wherein the value of the adjusted second level is half that of the adjusted first level.

4. The video pre-amplifier of claim 1, wherein the OSD intensity control signal is generated by a micro-controller in the display device and is input into the OSD interface block.

5. A video pre-amplifier for a display device which synthesizes, amplifies, and outputs received red, green and blue (R, G, and B) video signals and R, G, and B on-screen display (OSD) signals, respectively, comprising:
   an OSD interface block for receiving the R, G, and B OSD signals and outputting modified R, G, and B OSD signals, the OSD interface block comprising:
      an R OSD interface unit for modifying the R OSD signal in response to an R OSD intensity control signal and generating the modified R OSD signal;
      a G OSD interface unit for modifying the G OSD signal in response to a G OSD intensity control signal and generating the modified G OSD signal; and
      a B OSD interface unit for modifying the B OSD signal in response to a B OSD intensity control signal and generating the modified B OSD signal;
   a video signal amplifying block for synthesizing the modified R, G, and B OSD signals with the R, G, and B video signals, respectively, amplifying the synthesized signals, and generating R, G, and B output signals;
   an IIC bus control unit for interfacing a micro-controller with the video signal amplifying block and for generating a mode signal; and
   an intensity control unit for generating the R, G, and B OSD intensity control signals based on a combination of the mode signal and an intensity control signal.

6. The video pre-amplifier of claim 5, wherein the R OSD interface unit modifies the R OSD signal to a first level in response to a first control level of the R OSD intensity control signal and to a second level in response to a second control level, and the G OSD interface unit modifies the G OSD signal to a first level in response to a first control level of the G OSD intensity control signal and to a second level in response to a second control level, and the B OSD interface unit modifies the B OSD signal to a first level in response to a first control level of the B OSD intensity control signal and to a second level in response to a second control level.

7. The video pre-amplifier of claim 6, wherein the second level is half the first level.

8. The video pre-amplifier of claim 7, wherein the first level is 0.7 Vpp and the second level is 0.35 Vpp.

9. The video pre-amplifier of claim 6, wherein the intensity control unit receives a 1-bit intensity control signal and a 2-bit mode signal, wherein if the intensity control signal is a predetermined first intensity level, the R, G, and B OSD intensity control signals having the first control levels are generated, and if the intensity control signal is a predetermined second intensity level, the R, G, and B OSD intensity control signals having the second control levels are generated when the mode signal is a predetermined first mode, the R OSD intensity control signal having the first control level and the G and B OSD intensity control signals having the second control levels are generated when the mode signal is a predetermined second mode, the G OSD intensity control signal having the first control level and the R and B OSD intensity control signals having the second control levels are generated when the mode signal is a predetermined third mode, and the B OSD intensity control signal having the first control level and the R and G OSD intensity control signals having the second control levels are generated when the mode signal is a predetermined fourth mode.

10. The video pre-amplifier of claim 5, wherein the mode signal is generated by the micro-controller in the display device and is stored in a register of the IIC bus control unit.

11. A method of providing an increased number of OSD signal colors in a display device having a video pre-amplifier which synthesizes, amplifies, and outputs received red, green and blue (R, G, and B) video signals and R, G, and B on-screen display (OSD) signals, respectively, comprising:
   (a) setting an OSD intensity control signal and a mode signal;
   (b) generating R, G, and B OSD intensity control signals based on combinations of the OSD intensity control signal and the mode signal;
   (c) modifying the R, G, and B OSD signals based on the R, G, and B OSD intensity control signals, respectively;
   (d) synthesizing the modified R, G, and B OSD signals with the R, G, and B video signals, respectively; and
   (e) generating R, G, and B output signals by amplifying the synthesized signals.

12. The method of claim 11, wherein the step (c) comprises the steps of:
   (c1) modifying the R OSD signal to a first level in response to a first control level of the R OSD intensity control signal and to a second level in response to a second control level;
   (c2) modifying the G OSD signal to a first level in response to a first control level of the G OSD intensity control signal and to a second level in response to a second control level; and
   (c3) modifying the B OSD signal to a first level in response to a first control level of the B OSD intensity control signal and to a second level in response to a second control level.

13. The method of claim 12, wherein the second level is half of the first level.

14. The method of claim 11, wherein the OSD intensity control signal and the mode signal are set during production of the display device.

15. The method of claim 11, wherein the OSD intensity control signal and the mode signal are set by a user of the display device.

* * * * *